(12) United States Patent
McCaffrey (10) Patent No.: US 6,953,337 B2
(45) Date of Patent: Oct. 11, 2005

(54) TRANSFER OF HOT FEED MATERIALS FROM A PREPROCESSING PLANT TO AN ELECTRIC SMELTING OR MELTING FURNACE

(75) Inventor: Felim P. McCaffrey, Toronto (CA)

(73) Assignee: Hatch Ltd., Mississauga (CA)

( * ) Notice: Subject to any disclaimer, the term of this patent is extended or adjusted under 35 U.S.C. 154(b) by 0 days.

(21) Appl. No.: 10/472,349

(22) PCT Filed: Mar. 19, 2002

(86) PCT No.: PCT/CA02/00387

§ 371 (c)(1),
(2), (4) Date: Jun. 3, 2004

(87) PCT Pub. No.: WO02/077297

PCT Pub. Date: Oct. 3, 2002

(65) Prior Publication Data

US 2004/0214125 A1 Oct. 28, 2004

(30) Foreign Application Priority Data

Mar. 22, 2001 (CA) .............................................. 2341772

(51) Int. Cl.[7] .............................. F27D 3/00; F27D 15/00
(52) U.S. Cl. .......................................... 432/86; 373/79
(58) Field of Search .............................. 432/86, 87, 93, 432/135, 239; 219/520, 523; 373/9, 79, 81, 115, 142

(56) References Cited

U.S. PATENT DOCUMENTS

| | | | | |
|---|---|---|---|---|
| 1,944,521 A | * | 1/1934 | Miguet et al. | ............. 75/10.46 |
| 3,033,673 A | | 5/1962 | Collin et al. | |
| 3,472,649 A | | 10/1969 | Sibakin et al. | |
| 3,472,650 A | | 10/1969 | Sibakin et al. | |
| 3,746,325 A | * | 7/1973 | Freeberg et al. | ............ 266/143 |
| 3,752,897 A | * | 8/1973 | Atsukawa | .................... 373/115 |
| 3,913,898 A | * | 10/1975 | Wolters | ...................... 266/142 |
| 4,390,168 A | * | 6/1983 | Muller | ........................ 266/142 |
| 4,402,083 A | * | 8/1983 | Paskarbeit et al. | ............ 373/79 |
| 4,624,003 A | * | 11/1986 | Eirich et al. | ................. 373/120 |
| 4,642,048 A | | 2/1987 | Kim | |
| 4,963,182 A | * | 10/1990 | Bishop et al. | ................. 75/590 |
| 5,149,062 A | * | 9/1992 | Matsuo et al. | .............. 266/172 |
| 5,238,484 A | * | 8/1993 | Pirklbauer et al. | ............ 75/414 |
| 5,390,212 A | | 2/1995 | Bonnet et al. | |
| 6,155,333 A | | 12/2000 | Vallomy | |

FOREIGN PATENT DOCUMENTS

| | | |
|---|---|---|
| EP | 0247133 | 12/1987 |
| FR | 1536190 | 8/1968 |
| GB | 2155160 | 9/1985 |

* cited by examiner

Primary Examiner—Gregory Wilson
(74) Attorney, Agent, or Firm—Kirkpatrick & Lockhart Nicholson Graham LLP

(57) ABSTRACT

Apparatus for transferring hot material between a preprocessing plant and an electric furnace has an enclosed housing extending between the plant and the furnace and within which a controlled atmosphere is maintained, at least one bin having at least one compartment receiving feedstock material at a delivery station from the plant, mechanism for shuttling the at least one bin along a path within the housing between the delivery station and discharge tubes above and leading into the furnace at distributed locations, and discharge mechanism for dropping material from each compartment into a discharge tube. The path may be horizontal, vertical, or inclined to suit the relative locations of the preprocessing plant and the battery. Each bin is usually each divided to feed multiple tubes. The shuttling mechanism may be a hoist or a railway or cable span, and the discharge mechanism is typically a means for tipping the bin. The bin should be such that the depth of material therein during transit is sufficiently low to limit its coagulation of the material in transit, if this is a problem.

19 Claims, 7 Drawing Sheets

TRANSFER OF HOT FEED MATERIALS FROM A PREPROCESSING PLANT TO AN ELECTRIC SMELTING OR MELTING FURNACE

CROSS-REFERENCE TO RELATED APPLICATIONS

This application claims the benefit of International Application No. PCT/CA02/00387, which was filed on Mar. 19, 2002 and published under PCT Article 21(2) in English and which claims the benefit of Canadian Patent Application No. 2,341,772 filed on Mar. 22, 2001.

FIELD OF THE INVENTION

This invention relates to the transfer of hot feed materials from a preprocessing plant to an electric smelting or melting furnace. The preprocessing plant may be a kiln, a direct reduction facility, or a rotary hearth furnace, in which an ore is calcined, sintered or reduced.

BACKGROUND OF THE INVENTION

The problems associated with the transportation of hot feed materials arise from their inherent characteristics, which may include some or all of the following:
(a) The materials are hot (up to 1000° C.), are normally abrasive and normally contain a significant amount of fines. This combination of characteristics has a strong negative impact on mechanical and electrical equipment, to a degree that makes it impractical to use certain equipment and devices which perform satisfactorily over long periods with less aggressive materials.
(b) Once the materials, for example pre-reduced calcined laterite, are exposed to air, they may begin to burn, releasing pollutants which must then be captured.
(c) The process of pre-reduction in a kiln or other device reduces the oxygen content of metallic ores. The subsequent burning in air reverses the reduction process and thereby wastes some of the energy used in reduction.
(d) Certain reduced ores, such as partially reduced iron ore, have a tendency to agglomerate if piled for even short periods of time. Thus, batch transportation in a container with a hopper-shaped bottom may cause sufficient agglomeration in 5–10 minutes to prevent the material from flowing out of the opening in the container bottom.

A typical hot material transfer system might consist of the following:
(a) A valve on the output end of a kiln discharges calcine into a container below, which is mounted on a transfer car.
(b) Once the container is filled, the transfer car travels into the furnace building with the full container, which is then picked up by the furnace-charging crane. The crane raises the container to an elevation just above the top of the furnace feed bins, which are located directly above the furnace.
(c) The crane places the container on the bin and the action of setting the container down causes it to discharge the calcine down into the bin.

The transfer process just described is characterized by significant release of pollutants, at the kiln discharge valve, from the container itself while in transit, and at the loading of the feed bin from the container.

The total distance travelled by the container, vertical and horizontal, is, in a typical case, about 60 meters. The provision of an emission control system, large enough to cover the arrangement just described, and consisting of hood, ducting fan, baghouse and controls, imposes a large financial burden, in both capital and operating costs. Systems using drag chain conveyors or other transportation methods have similar problems.

One transfer system which has been widely discussed but not widely employed, consists of placing the kiln at a higher elevation than the furnace and using gravity to transfer the hot material downwards through closed pipes or ducts. This has the following advantages:
(a) Pollution and dust are eliminated since the material is enclosed at all times and in an oxygen-starved atmosphere.
(b) A continuously discharging source of material can be continuously distributed into the furnace below without resorting to batch feeding the furnace. This is particularly beneficial with an electric smelting furnace.
(e) No complex mechanical/electrical equipment is required which could be adversely impacted by the hot, abrasive, dusty material.

The operational advantages of this system are offset by the very high capital cost involved in locating a kiln or a rotary hearth furnace 30 m± above grade elevation, particularly in areas of high seismic risk.

In practical situations, the material may need to be fed to the furnaces at a substantially different, but usually higher, level than that at which it is discharged from the calcining plant. The calcine needs to be distributed in a controlled manner through multiple feed ports into the furnace.

It is an object of the invention to provide a transfer system which addresses the above problems.

SUMMARY OF THE INVENTION

According to the invention, apparatus for transferring hot material between a preprocessing plant and an electric furnace comprises an enclosed housing extending between the plant and the furnace and within which a controlled atmosphere is maintained, at least one bin having at least one compartment receiving feedstock material at a delivery station from the plant, mechanism for shuttling the at least one bin along a path within the housing between the delivery station and discharge tubes above and leading into the furnace at distributed locations, and discharge mechanism for dropping material from each compartment into a discharge tube. The path may be horizontal, vertical, or inclined, to suit the relative locations of the preprocessing plant and the battery. Each bin is usually each divided to feed multiple tubes. The shuttling mechanism may be a hoist or a railway or cable span, and the discharge mechanism is typically a means for tipping the bin. The bin should be such that the depth of material therein during transit is sufficiently low to limit coagulation of the material in transit, if this is a problem.

This arrangement enables the entire transfer operation to be carried out in a controlled atmosphere, with transfer time reduced to a minimum, and without any substantial static accumulation of material, while, at the same time, allowing the transfer components to be very simple and robust with a minimum need for maintenance.

Further features of the invention will be apparent from the following description of presently preferred embodiments of the invention with reference to the accompanying drawings.

DESCRIPTION OF THE PREFERRED EMBODIMENT

Figure 1:
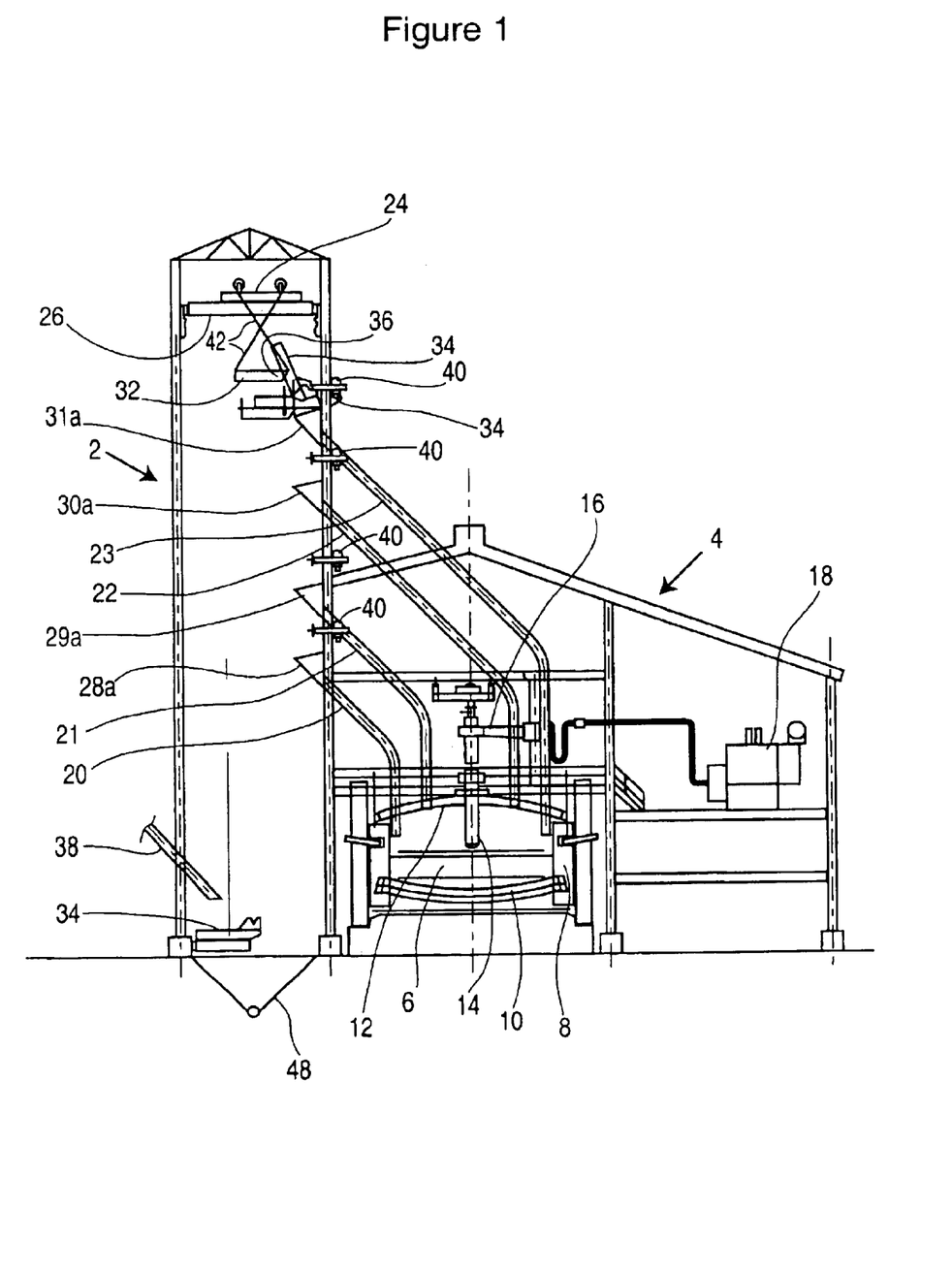
FIG. 1 is a vertical section through a first embodiment of apparatus according to the invention, and an associated furnace.
Figure 2:
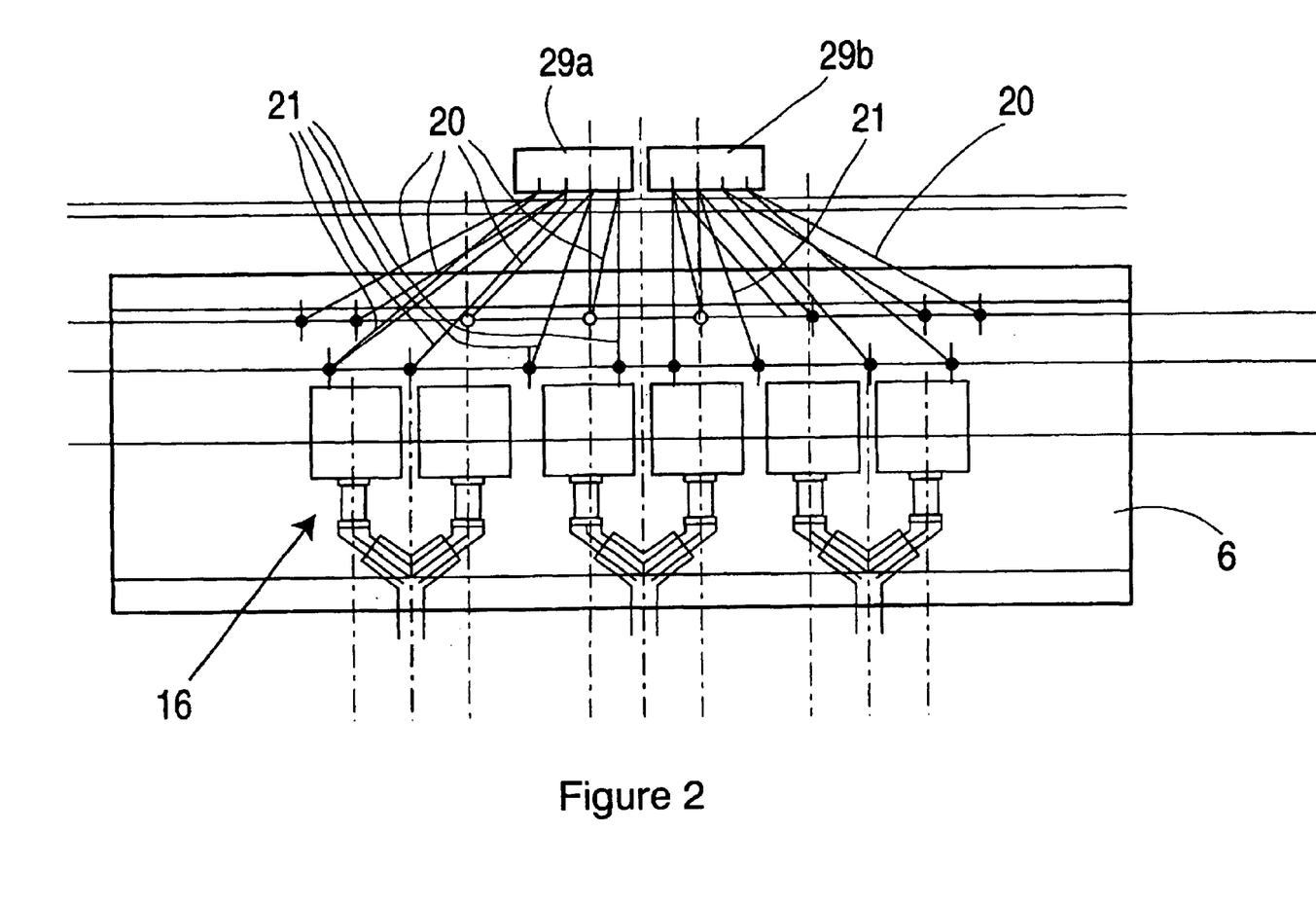
FIG. 2 is a schematic plan view, showing tubes connecting between a first, lower group of discharge chutes and the furnace roof.
Figure 3:
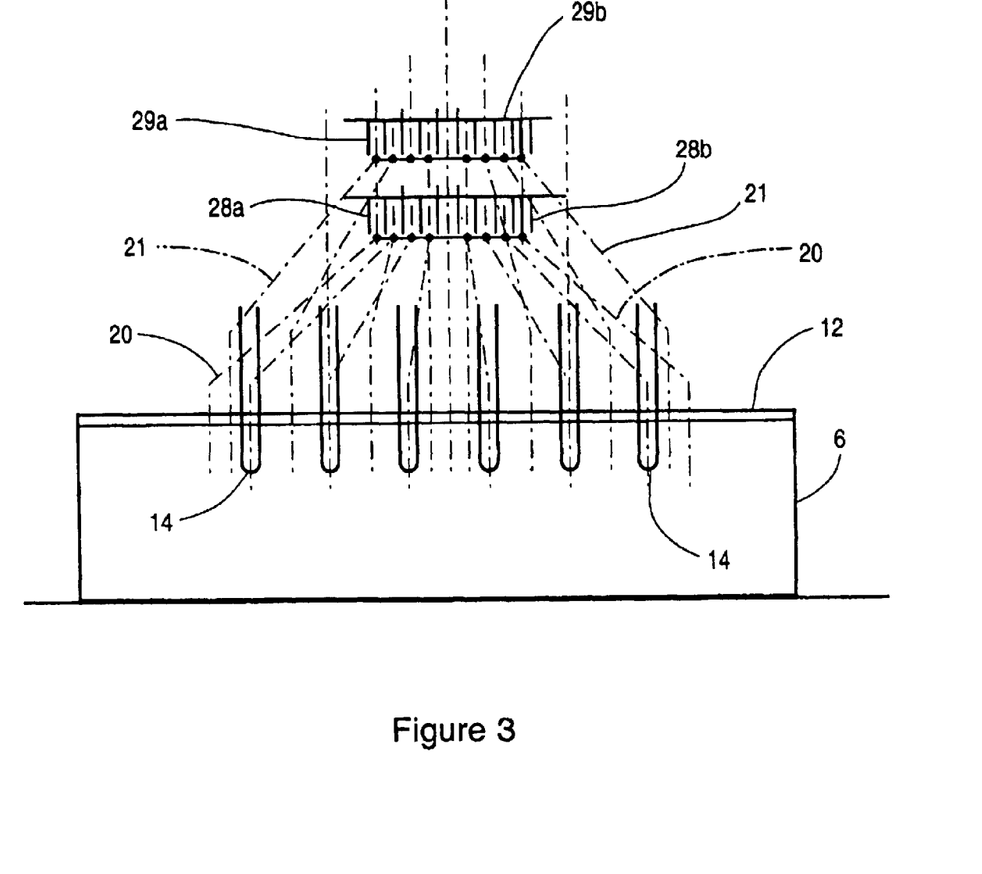
FIG. 3 is a schematic plan view, showing tubes connection between a second, upper group of discharge chutes and the furnace roof.
Figure 4:
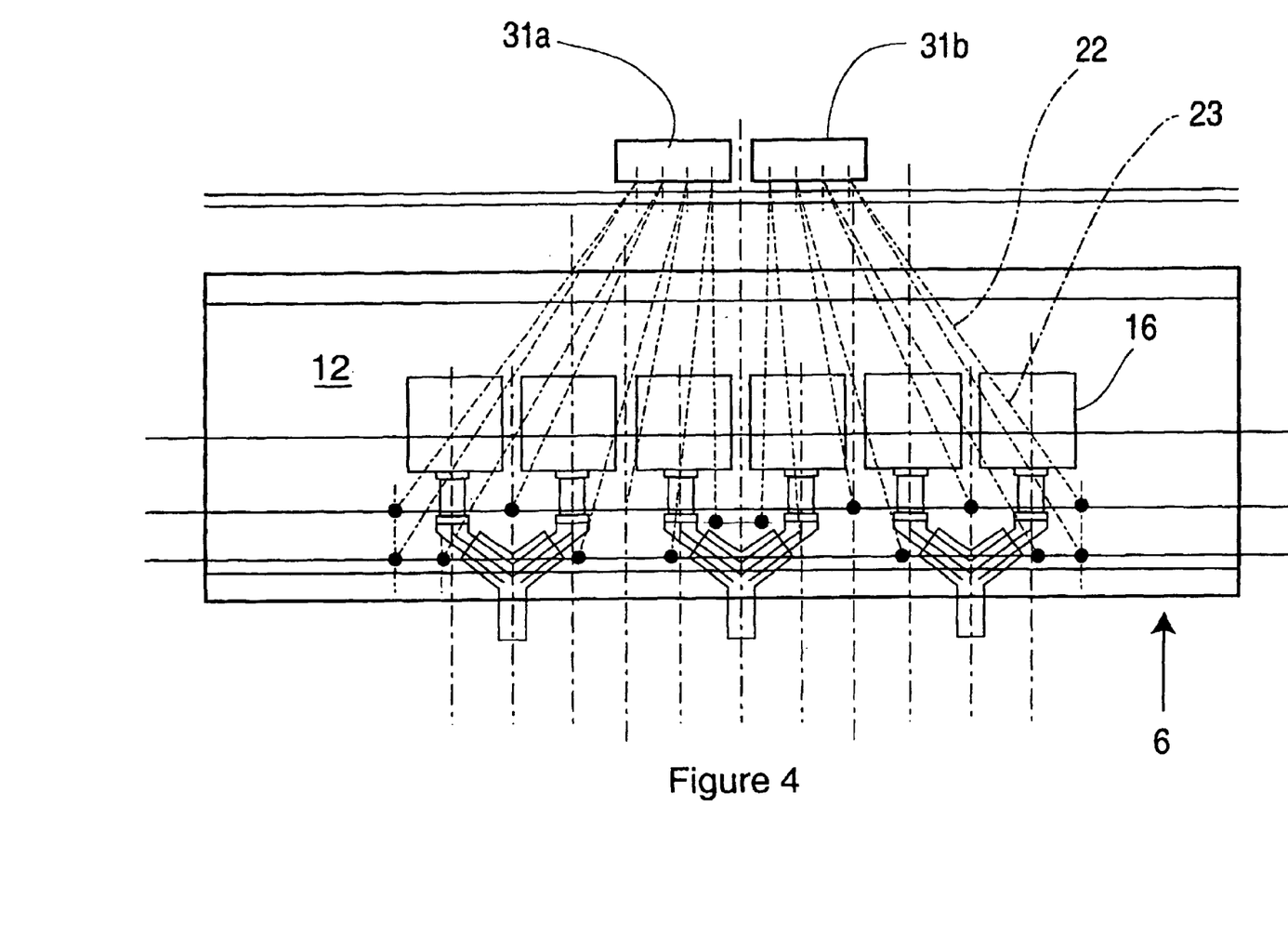
FIG. 4 is a schematic elevation corresponding to FIG. 2.
Figure 5:
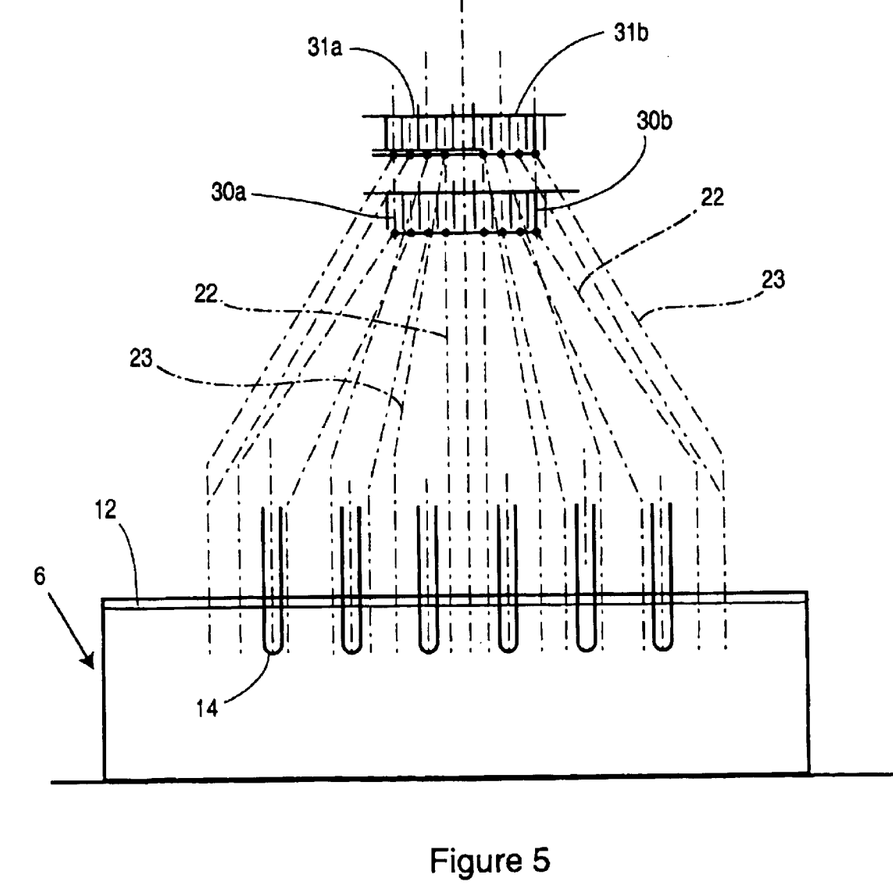
FIG. 5 is a schematic elevation corresponding to FIG. 3.

Referring to FIG. 1, an enclosed tower 2 is erected alongside a shed 4 housing an electric furnace 6 with side walls 8, a floor 10, a roof 12 and a row of electrodes 14 descending through the roof from electrode and control mechanisms 16 receiving electrical supply from transformers 18. The construction of the furnace is conventional and forms no part of the invention beyond that the furnace roof 12 has ports through which tubes 20, 21, 22 and 23 deliver preprocessed material to the furnace.

The tower 2 contains two hoists 24 mounted for limited movement on a platform 26 on a horizontal axis perpendicular to the axis of the row of furnace electrodes 14. Pairs of funnel assemblies 28a, 28b, 29a, 29b, 30a, 30b, and 31a, 31b are mounted on the wall of the tower nearest the shed 4 at different levels above the furnaces 6. The funnel assemblies are each divided into four funnels, each of which forms an enlarged opening to one of the tubes through which calcine is delivered to the furnace. The connections of the tubes between the chutes and furnace are illustrated in FIGS. 2 through 5.

Each hoist is connected by cables 42 to a frame 32 supporting a compartmented tray 34 through pivots 36 so that the tray may be tipped as shown in its uppermost depiction in FIG. 1 by a tipping mechanism 40 to deliver the contents of its compartments into the funnels of an adjacent funnel assembly. Each tray is approximately the same width as a funnel assembly. When a tray 34 is in the lowest position shown in FIG. 1, its compartments receive material in turn through a chute 38 from a calcining plant (not shown). The compartments need not be filled equally, thus providing great flexibility in determining how material is distributed within the furnace. Once a tray is loaded, its associated hoist is operated to raise it to a position just above a funnel assembly to which it is to deliver its load, and it is then moved to the right (with reference to its depiction in FIG. 1) to the middle position shown in that drawing, and hoisted further upwards so that the tipping mechanism discharges its contents into the chute, whereafter it is withdrawn to the left and lowered to its initial position at the bottom of the tower to receive further material. One plafform 26 and its associated hoist serves in turn the funnel assemblies 28a, 29a, 30a, and 31a, while the other serves in turn the funnel assemblies 28b, 29b, 30b and 31b, servicing each discharge chute so as to distribute the material throughout the furnace. The hoist 24 and tray 34 are duplicated to eliminate the need for movement within the tower parallel to the electrodes, with operation of the hoists timed so that one tray is always available to receive a continuous stream of material from the feed chute 38. The hoist cables 42 are crossed as shown in known manner so as to dampen swaying of the tray.

Figure 6:
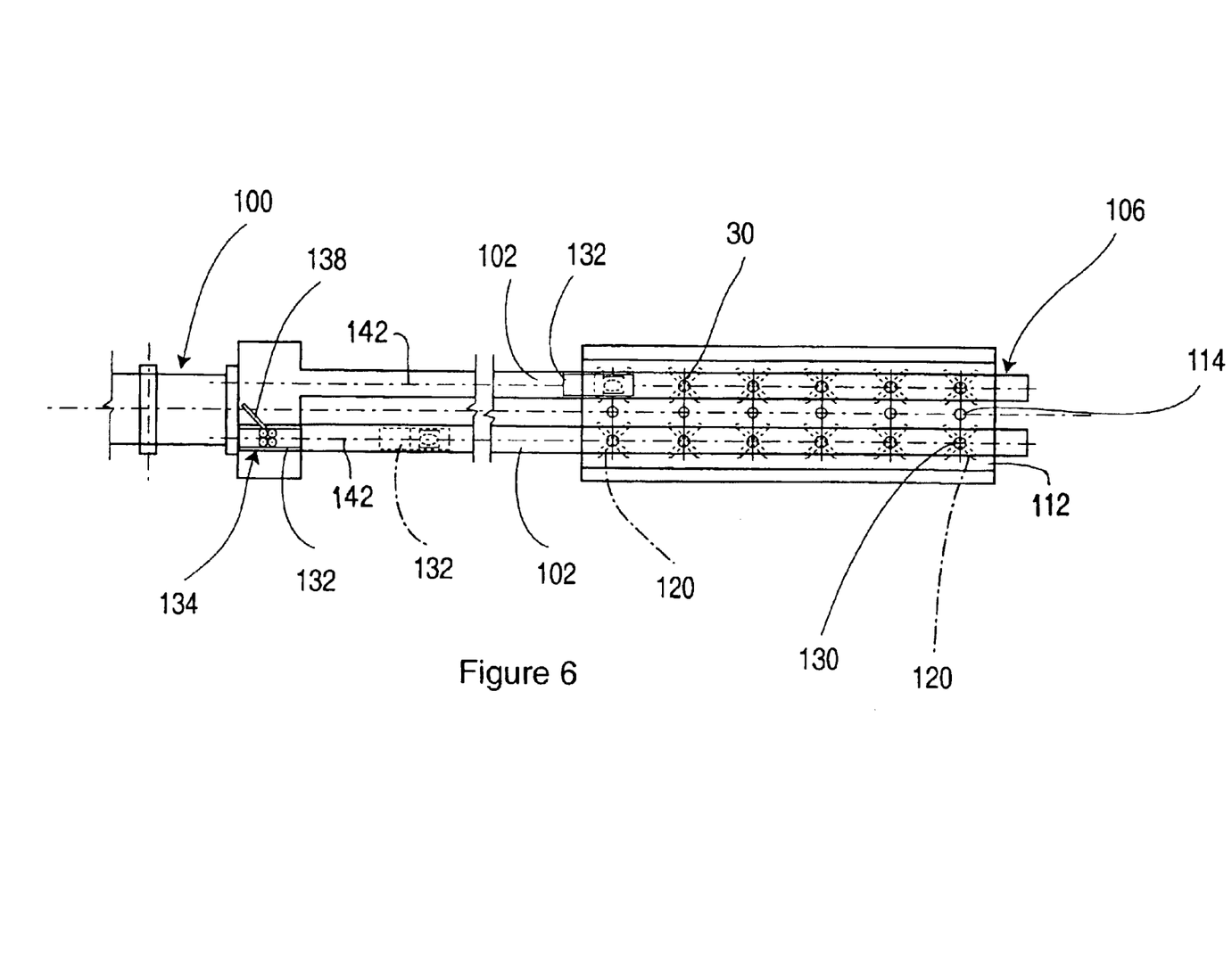
FIG. 6 is a plan view of a second embodiment of apparatus according to the invention, part of an associated calcining plant, and a furnace with a top cover of passages between the plant and the furnace omitted for clarity.
Figure 7:
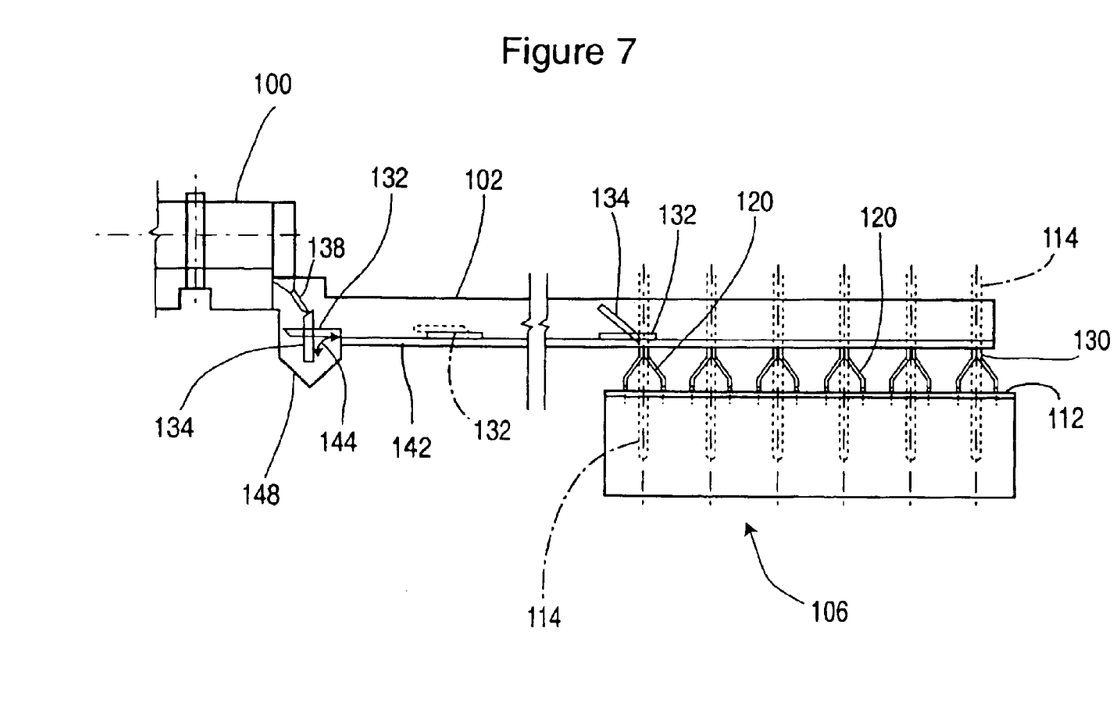
FIG. 7 is a corresponding side elevation, with a side cover of a passage omitted for clarity.
Figure 8:
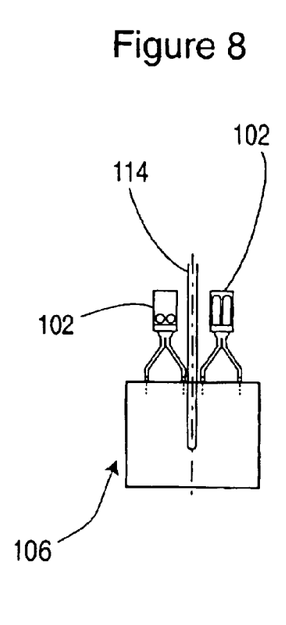
FIG. 8 is a vertical cross-section of the apparatus and furnace on the line 8—8 in FIG. 7.

In the embodiment shown in FIGS. 6 to 8, the preprocessing plant, in this case a calcining plant 100, is at a higher level than the furnace 106, and the axis of the latter is in line with the processing plant. The tower 2 is replaced by two passages 102 extending to either side of the electrodes 114 of the furnace and above the furnace roof 112. Within each passage a frame 132 supports a bin 134 for movement along rails 142 in the passage. At any time one or other bin 134 is positioned to receive calcine through a delivery chute 138 from the calcining plant 100 while the other delivers calcine to a selected funnel assembly 130 which distributes calcine to the furnace through tubes 120.

The bins 134 in the example shown consist of four compartments in the form of tubular containers which guides 144 cause to tilt to a vertical position to place open ends of the tubes beneath the chute 138 so that each may be wholly or partially filled with calcine. The tubular containers are returned to a near horizontal position for transit (as seen in FIGS. 6 and 7) before being tilted open end downwards at a selected funnel assembly 130 by a selectively engaged tipper mechanism (not shown) so as to discharge their content into funnels of the assembly which are connected to the tubes 120.

In each embodiment, the tower 2 or passages 102 are enclosed to exclude the ambient atmosphere, and the atmosphere inside is controlled, both to avoid release of fumes, and to avoid unwanted reactions with the material being transported. For example, off-gas from the calcining plant or furnace, or waste gas from elsewhere in the plant may be admitted, surplus gas being passed to an appropriate treatment plant. Gas may be admitted at either the top or bottom of the volume to be filled according to whether it is heavier or lighter than ambient air such as to displace air from the volume concerned. Alternatively, the volume may be allowed to fill with gases emitted from the material, suitable treatment facilities again being provided to handle surplus gas. The tower or passages also provide an opportunity for dust from the material to settle. A hopper 48 (FIG. 1) or 148 (FIG. 7) provides a means for capturing and removing settled dust.

The embodiments described are exemplary only. In the embodiments described, the shuttle path is respectively vertical and horizontal. It should be understood that applications in which the housings (tower or passage) are inclined, either laterally or longitudinally, so as to have both vertical and horizontal extent are also within the scope of the invention, with the shuttle(s) for the tray(s) or bin(s) having suitable guidance to follow the inclined path. Regardless of the arrangement used, a shuttle mechanism within the housing is used to provide rapid transportation of material, as it is delivered, to distributed points within the furnace, without any substantial accumulation of material. Distribution of the material within the furnace can be controlled by controlling the amount of material discharged into each compartment within the shuttle tray or bin, while permitting extremely simple and robust mechanisms to be utilized.

What is claimed is:

1. Apparatus for transferring hot material between a preprocessing plant and an electric furnace comprising an enclosed housing extending between the plant and the furnace and within which a controlled atmosphere is maintained, at least one bin having at least one compartment receiving material at a delivery station from the plant, mechanism for shuttling the at least one bin along a path within the housing between the delivery station and discharge tubes above and leading into the furnace at distributed locations, and discharge mechanism for dropping material from each compartment into a discharge tube; wherein the shuttling mechanism comprises one of a hoist, a railway, and a cable span.

2. Apparatus according to claim 1, wherein the housing extends vertically.

3. Apparatus according to claim 1, wherein the housing extends horizontally.

4. Apparatus according to claim 1, wherein the discharge tubes have funnels at their upper ends grouped to receive material simultaneously from the compartments of a bin.

5. Apparatus according to claim 1, wherein the bin is discharged by tipping.

6. Apparatus according to claim 1, wherein the bin is a compartmented tray.

7. Apparatus according to claim 1, wherein the bin comprises multiple tubular compartments.

8. Apparatus according to claim 1, having two bins and two shuttling mechanisms, one bin being at the delivery station while the other is shuttled to the discharge tubes.

9. Apparatus according to claim 1, wherein the housing excludes the ambient atmosphere.

10. Apparatus for transferring hot material between a preprocessing plant and an electric furnace comprising an enclosed housing extending between the plant and the furnace and within which a controlled atmosphere is maintained, at least one bin having at least one compartment receiving material at a delivery station from the plant, mechanism for shuttling the at least one bin along a path within the housing between the delivery station and discharge tubes above and leading into the furnace at distributed locations, and discharge mechanism for dropping material from each compartment into a discharge tube; wherein the bin comprises multiple tubular compartments.

11. Apparatus according to claim 10, wherein the housing extends in at least one of a vertical and a horizontal direction.

12. Apparatus according to claim 10, wherein the shuttling mechanism comprises one of a hoist, a railway, and a cable span.

13. Apparatus according to claim 10, wherein the discharge tubes have funnels at their upper ends grouped to receive material simultaneously from the compartments of a bin.

14. Apparatus according to claim 10, wherein the bin is discharged by tipping.

15. Apparatus according to claim 10, wherein the bin is a compartmented tray.

16. Apparatus according to claim 10, wherein the bin comprises multiple tubular compartments.

17. Apparatus according to claim 10, having two bins and two shuttling mechanisms, one bin being at the delivery station while the other is shuttled to the discharge tubes.

18. Apparatus according to claim 10, wherein the housing excludes the ambient atmosphere.

19. Apparatus for transferring hot material between a preprocessing plant and an electric furnace comprising an enclosed housing extending between the plant and the furnace and within which a controlled atmosphere is maintained, at least one bin having at least one compartment receiving material at a delivery station from the plant, mechanism for shuttling the at least one bin along a path within the housing between the delivery station and discharge tubes above and leading into the furnace at distributed locations, and discharge mechanism for dropping material from each compartment into a discharge tube; having two bins and two shuttling mechanisms, one bin being at the delivery station while the other is shuttled to the discharge tubes.

* * * * *